UNITED STATES PATENT OFFICE.

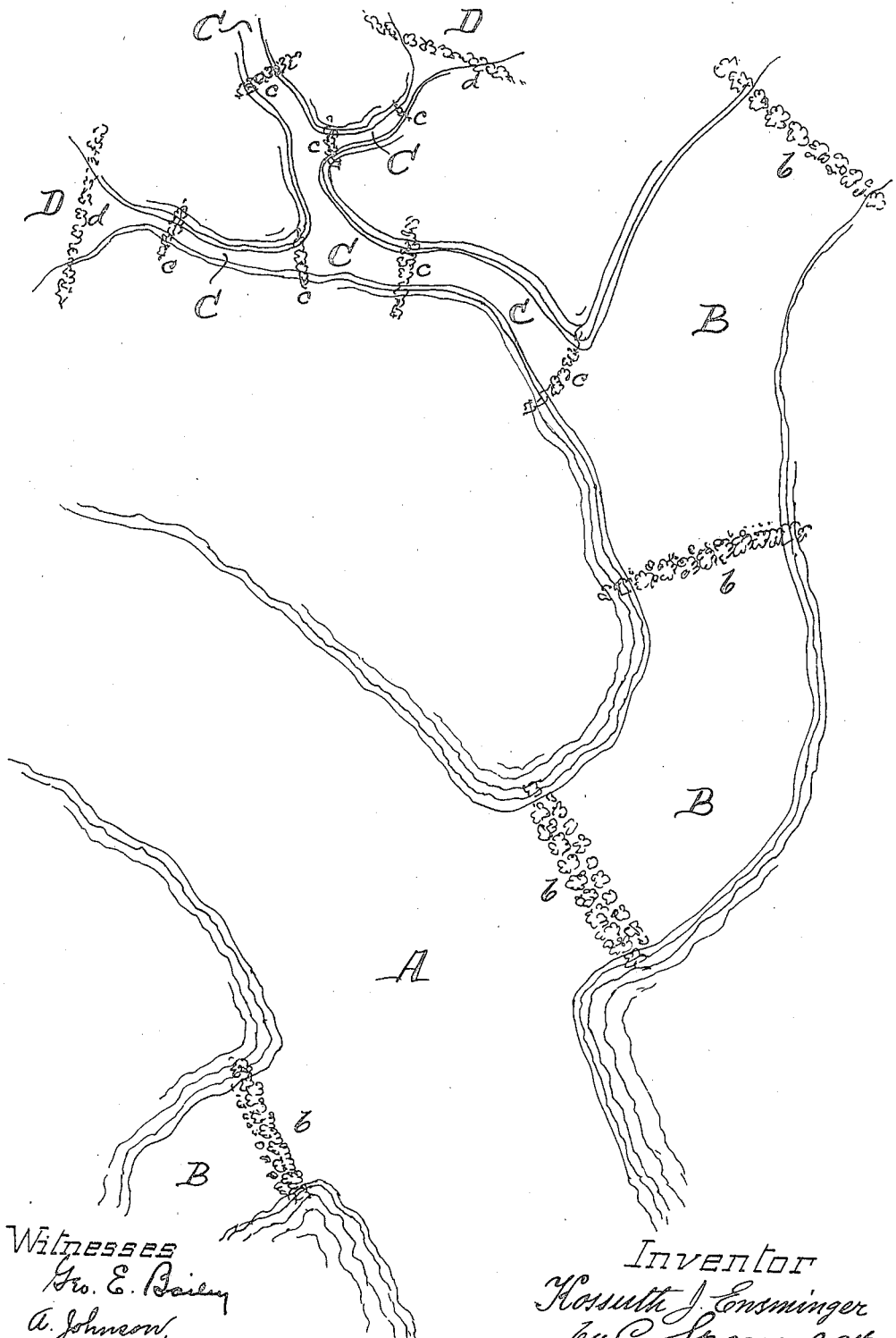

KOSSUTH J. ENSMINGER, OF HAMERSVILLE, OHIO.

MEANS AND DEVICE TO CONTROL AND REGULATE THE FLOW OF SURFACE WATER.

1,104,483.   Specification of Letters Patent.   Patented July 21, 1914.

Application filed November 28, 1913. Serial No. 803,466.

*To all whom it may concern:*

Be it known that I, KOSSUTH J. ENSMINGER, a citizen of the United States, and a resident of Hamersville, Brown county, State of Ohio, have invented certain new and useful Means and Devices to Control and Regulate the Flow of Surface Water; and I do declare the following to be a clear, full, and exact description of the invention, attention being called to the drawing which accompanies this application and forms a part thereof.

This invention concerns means and devices for controlling and for regulating the flow of surface water which results from rain and from melting snow, for the purpose of reducing and preventing the rapid rise and consequent overflow of rivers and of their tributaries, streams, creeks, runs etc. It is considered that one of the principal causes of the rapid rise in such water courses is the short time in which surface water which results from heavy or extended rains or from sudden thaws reaches them.

The object of my invention is to check and retard the flow of surface water in a manner that it reaches its natural courses and outlets only gradually, thus affording time for the larger courses, rivers and streams to carry this addition off at a rate substantially or nearly equal to the rate at which it arrives and in a manner which does not materially affect their normal level.

The plan of my invention provides for the checking of this surface water in those formations of the surface of a water-shed or river-basin in which it first seeks to collect, as in cuts, fissures, gullies, ravines, and farther along in rivulets, brooks, the smaller creeks and finally in the larger ones. As to the larger courses like streams and rivers, similar protection near or at the banks is merely contemplated.

Another object of my invention is to use means which, after once placed in position, require very little attention and in the main take care of themselves. These means consist of living plants, like willows and related species, also plants of the shrub and hedge-forming type and which are suitable for the soil in which they are to be planted and where they are expected to grow. In other words, living checks or dams are provided in a water-shed at suitable intervals across the courses named which feed the larger bodies of water. In time, undergrowth results which by means of drift, floating matter like leaves, wood etc., carried along by the water, would be rendered more or less dense, yet as compared with dams, it would not form an absolutely closed obstruction to the flow of water like these and which is not contemplated. On the contrary it would permit the water to pass off but only gradually so as to lengthen the time in which the water from one branch would meet or enter another branch or reach final outlets. Thus reduced volumes of water only would meet or reach outlets so that sudden and destructive rises in normal levels would not occur.

For the further explanation of my plan, I refer now to the drawing which presents substantially a stretch of territory comprising a water-shed adjacent a river or stream and feeders thereof which carry the surface water into the same.

In the drawing A, represents this large body of water. B—B are larger feeders like tributaries, creeks and C—C are smaller feeders like brooks, rivulets etc. D—D. may represent ground formations like depressions, cuts, ravines and gullies which not necessarily carry water and are mostly dry except during a rain or thaw. Across all of these, I provide my living plant-checks, the plants being set in rows arranged transversely across these courses, the planting being done at times and under conditions which would insure the growth of the plants and the permanency of retention of their positions. The plants would be set fairly close so in time resulting undergrowth from one would meet the undergrowth from adjoining plants. These checks would be spaced with regard to the profile formation or grade of the surface over which the water flows. Thus for instance there would be one at *d* where a depression would merge into a small feeder or brook C. There would also be one at *c* where a small feeder joins a larger one and finally there would be one at *b* where a tributary empties into river A. Spaced back from these checks at points higher up, additional checks would be established in each course, first spaced closer to each other especially at steeper grades so as to have a check for every drop of surface as represented by a certain number of feet or inches. At higher altitudes, for instance, and where the land assumes the character of a plateau, the checks might be spaced a quarter or half mile apart, while farther down they should be as close to each other as 1500, 1000, 500 and 300 feet.

Obviously no fixed rule can be laid down as to that part of my plan and in each case conditions as they are in any particular locality would have to be considered and the usual or normal rain fall would have to be taken in account as one of the factors. In the higher altitudes where the depressions form part of farm land, the checks might assume the form of hedges, the plants being selected with a view to ornamental effect or for practical purposes, as black-berry bushes for instance in the latter case.

Various incidental advantages are connected with my plan, for instance, the rapid flow of the water being checked, the land will not be torn by ever increasing fissures and waste of alluvial soil is prevented. Preservation of fish, particularly game fish, is also favored since the destruction of the spawn is prevented. This is also due to the fact that the water is clear since most of the sand and gravel are filtered out.

The water being distributed over larger surfaces from which evaporation may take place, will produce a more even rainfall, thus removing one of the causes leading to destructive floods.

Plants, shrubs and trees should be selected after due consideration of all circumstances, and those of the perennial class are preferred.

Having described my invention, I claim as new:

1. Means for controlling and for regulating the flow of surface water resulting within the water-shed of a river, stream, etc., these means consisting of checks formed of living plants arranged in the feeders and surface depressions adapted to collect and to carry off surface water, said plants being set so close that resulting undergrowth will eventually meet and arranged in rows disposed across the course of these feeders so as to retard the flow of surface water collecting therein, but without positively stopping such flow.

2. Means for controlling and for regulating the flow of surface water resulting within the water-shed of a river, stream, etc., these means consisting of checks formed by rows of living plants arranged in the feeders and surface depressions adapted to collect and to carry off the surface water, said plants being set in rows so as to be transversely disposed across the course of collecting surface water and the checks so formed being spaced from each other and placed at intervals throughout the water courses so as to retard the flow of surface water from one check to the other but without positively stopping such flow.

In testimony whereof, I hereunto affix my signature in the presence of two witnesses.

KOSSUTH J. ENSMINGER.

Witnesses:
C. SPENGEL,
A. JOHNSON.